Oct. 6, 1942.   H. C. KNERR ET AL   2,297,778
BRINELL HARDNESS TESTING MACHINE
Filed Oct. 14, 1939   3 Sheets-Sheet 1
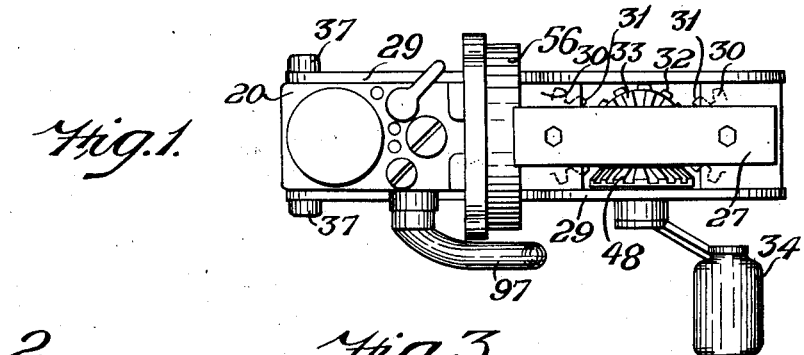
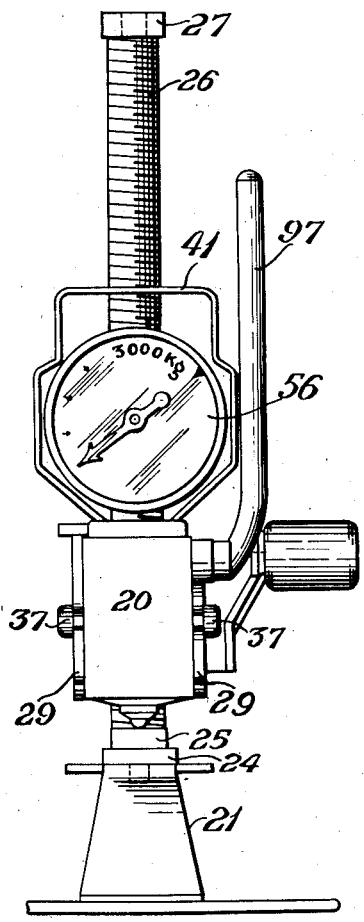
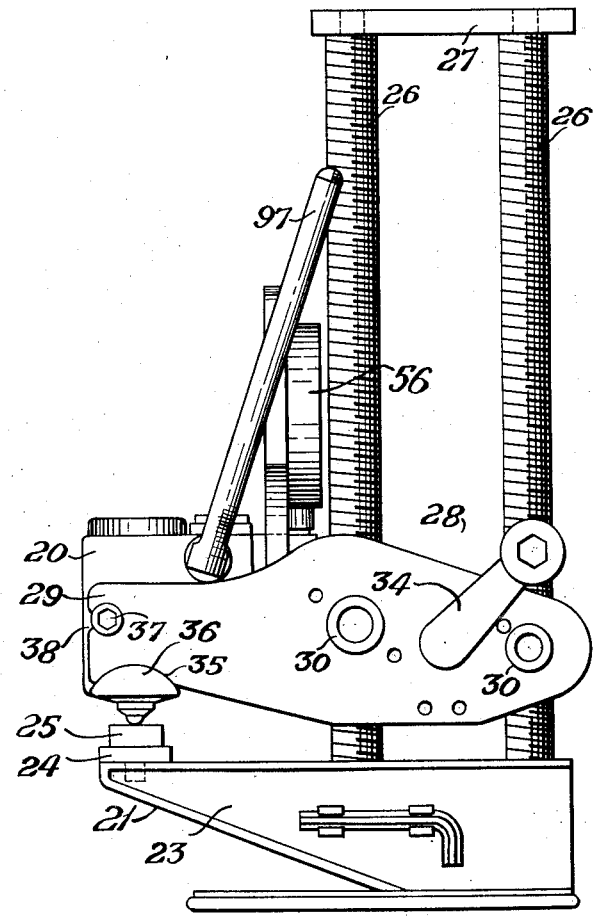
INVENTORS
HORACE C. KNERR
BY ANDREW KING
ATTORNEY Oct. 6, 1942.   H. C. KNERR ET AL   2,297,778
BRINELL HARDNESS TESTING MACHINE
Filed Oct. 14, 1939   3 Sheets-Sheet 2
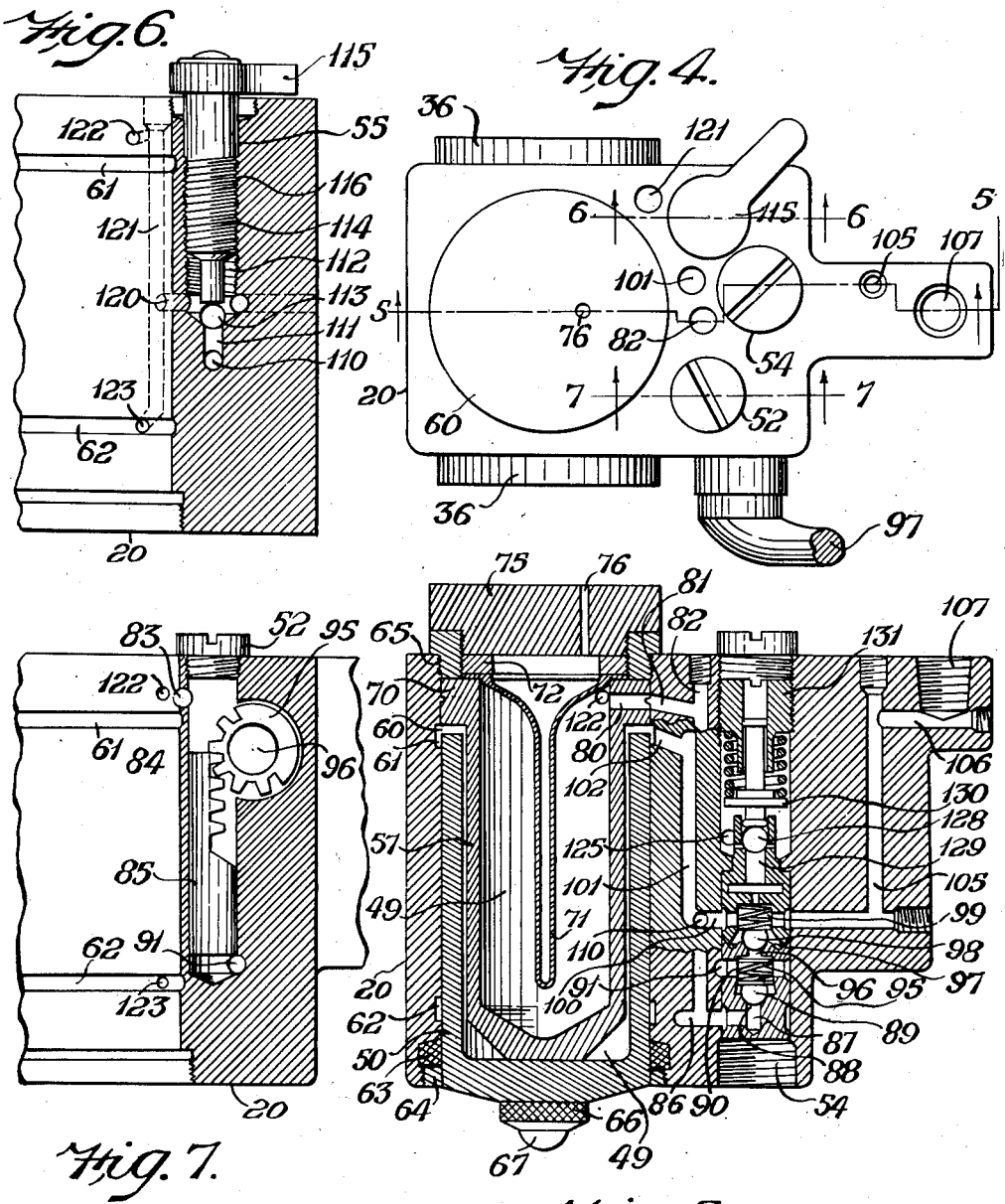
INVENTORS
HORACE C KNERR
ANDREW KING
BY
Thos. A. Ellis
ATTORNEY.

Oct. 6, 1942. H. C. KNERR ET AL 2,297,778
BRINELL HARDNESS TESTING MACHINE
Filed Oct. 14, 1939   3 Sheets-Sheet 3

INVENTORS
HORACE C KNERR
BY ANDREW KING
ATTORNEY

Patented Oct. 6, 1942

2,297,778

UNITED STATES PATENT OFFICE 2,297,778

BRINELL HARDNESS TESTING MACHINE

Horace C. Knerr, Chestnut Hill, and Andrew King, Penn Valley, Pa.

Application October 14, 1939, Serial No. 299,458

2 Claims. (Cl. 265—12)

This invention relates to hardness testing machines and, more particularly, to the type of such machine used for testing the Brinell hardness of various metals.

Heretofore when metal shapes were to be tested for their Brinell hardness it was necessary to bring the shapes to a heavy, fixed machine and move the shape into position between the Brinell ball and the anvil.

The present invention comprises a portable Brinell testing machine which may not only be moved readily by hand from one specimen to another but in which also the head and all parts necessary for exerting pressure on the ball may be removed as a unit from association with the anvil and mounted wherever suitable clamping means may be found.

A primary object of the invention is to provide a portable Brinell testing machine which may be operated in any position.

Another object of the invention is to provide a Brinell testing machine separable into a unitary ball carrying and operating head and into an anvil and frame.

A further object of the invention is to provide a Brinell head operable wherever a suitable anvil and clamp is available.

A further object is to provide a hydraulic Brinell testing machine in which no fluid will leak from the machine regardless of position.

A more specific object of the invention is to provide a Brinell testing machine in which means are provided for intercepting and returning to the sump before it reaches the gaskets all fluid under pressure on the ram.

Other specific objects and advantages of the invention will be apparent from the following specification, claims and from the drawings in which:

Fig. 1 is a plan view of the preferred embodiment of the invention;

Fig. 2 is a front elevation thereof;

Fig. 3 is a side elevation of the embodiment shown in Figs. 1 and 2;

Fig. 4 is a plan view of the head shown in Figs. 1 to 3;

Fig. 5 is a vertical sectional view taken on the line 5—5 of Fig. 4, partially broken away;

Figure 8:
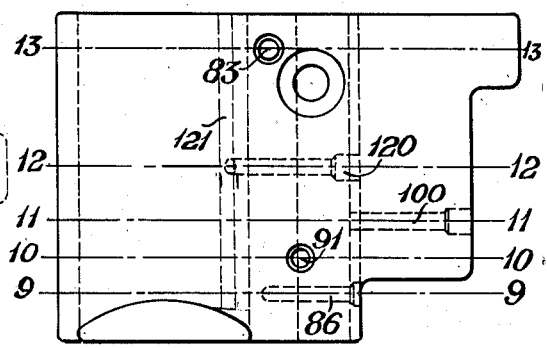

Figs. 6 and 7 are vertical sectional views taken on the lines 6—6 and 7—7 of Fig. 4;

Fig. 8 is a side elevational view of block forming a part of the head; and

Figs. 9 to 13 are horizontal sectional views of the block taken on the lines 9—9, 10—10, 11—11, 12—12 and 13—13 respectively of Fig. 8.

Referring now to the drawings in which is illustrated the now preferred embodiment of the invention a head 20 containing all operative elements for applying a predetermined pressure is mounted on frame indicated generally at 21. The frame may include a base 23 carrying an anvil 24 on which a test piece 25 may be placed. To the base is also connected two parallel vertical threaded posts 26 to the upper ends of which may be connected a horizontal strap 27 which helps maintain the posts 26 in parallelism and acts as a handle by which the entire machine may be carried.

A carriage indicated generally at 28 may be mounted for vertical movement on the two posts 26 in any conventional and well known manner. As indicated in Figures 1 and 3, two parallel side arms 29, 29, are connected to two transverse blocks 30 each comprising a gear 31, 31, interiorly threaded on one of the posts 26. The two gears 31, 31 mesh with a common gear 32 having a beveled face 33 which face meshes with a similarly beveled gear 48 keyed to a crank handle shaft passing through one of the side arms 29 and terminating in the handle 34. By turning the handle 34 the interiorly threaded gears will be moved along the posts 26 simultaneously and the carriage 28 raised or lowered normally with respect to the anvil 24 to accommodate work of different dimensions.

The forward ends of the two arms 29, 29, are spaced apart sufficiently to receive the head 20. The head may be arranged in a predetermined position over the anvil 24 by means of the opposed arced surfaces 35, 35 forwardly on the lower edges of the two arms 29 engaging two similarly shaped bosses 36, 36, on the head 20 and by the engagement of two opposed screws 37, 37 in the head 20 with two slots 38, 38 in the arms 29. As will be apparent from the drawings, especially Fig. 3, the arcs defining the surfaces 35, 35 and the corresponding surfaces of bosses 36, 36 are struck from a common axis which includes the center of the spherical indentor carried by the head and hereinafter more fully described and extends normal to the path of movement of the indentor, whereby forces acting through these surfaces when the machine is in use are kept substantially radial with respect to the indentor and lateral thrust due to "off center" application of pressure, with resultant inaccurate test readings, thereby minimized. The head 20 may be readily removed from the frame 21 by loosening the two screws 37, 37 and lifting the head out from between the two arms 29, 29. The head may be independently carried as by its handle 41.

The head 20 basically is a single block of metal bored, threaded, drilled and plugged as hereinafter described to provide a closed system for a hydraulic fluid 49 which may be oil and, for the sake of convenience, hereinafter termed oil, lying entirely within the block except for one connection and passageway to a pressure gauge 56. Broadly considered the system includes in addition to the pressure gauge 56 a ram or piston 50, a hand operated circulating pump 52, a pressure relief valve 54, a pressure release valve 55 and an oil sump 57.

In order to carry the ram 50 the head 20 may, adjacent its forward end, be centrally bored completely through from top to bottom to provide a cylinder 60 (Figures 5, 8 et seq.). The wall of the cylinder near its upper end may be circled by a groove 61 for purposes hereinafter described and similarly circled by a groove 62 near to lower end. Below groove 62 the cylinder may be counterbored to receive a packing gasket 63 and partially threaded to receive a gasket clamp ring 64.

The ram 50 may be shaped as a hollow plunger open at the upper end and closed at the lower end to which lower end may be axially connected as by the knurled nut 66 a conventional hardened ball 67. Partially within and spaced from the inner wall of the ram 50 lies the combined oil sump and cylinder head 57 the upper end of which carries a flange 70 having a diameter equal to the inner diameter of the cylinder 60 within which it makes a pressed fit above the ram 50. The upper end of the cylinder 60 may be threaded to receive an exteriorly and interiorly threaded nut 65, the lower surface of which bears against the outer portion of upper surface of the flange 70 and locks the sump 57 in place. The inner portion of the upper surface of the flange 70 forms a bearing surface for the upper open end of a flexible elastic and fluid proof sac 71 which may be held in place by a threaded lock washer 72 engaging the lower threads on the inner walls of the nut 65. The upper portions of the inner threads on the nut 65 are engaged by the threaded lower end of a hardened cap 75 which is perforated as at 76 to prevent formation of a vacuum as the sac 71 is expanded or contracted under varying oil conditions within the sump 57.

Figure 9:
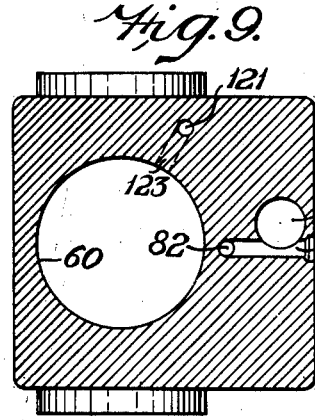
Figure 10:
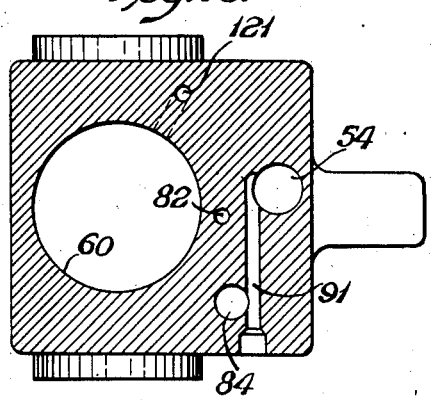

In order to lower the ram 50 to force the ball 67 into a specimen to be tested, oil is drawn from the sump 57 through a longitudinal horizontal bore 80 in the flange 70 and an aligned bore 81 in the head 20 (Figs. 5 and 13) into a vertical bore 82 connecting through longitudinal horizontal bore 86 with the lower end of the pressure relief valve chamber 54 (Figs. 5 and 9). From the lower end of the chamber 54 the oil passes upwardly through a port 87 in the seat 88 of a ball 89 and into an annular chamber 90 from which it passes into a transverse horizontal bore 91 connected to the lower end of the pump chamber 84. (Figs. 5, 7 and 10.)

So that there will be no suction through the gland around the shaft 96 of the pump gear 95 on the downward stroke, a transverse horizontal bore 83 connects the upper part of the pump cylinder 84 with the vertical bore 82 and hence with the sump 57.

From the structures so far described, it will be obvious that when the pump plunger 85 is raised through a partial rotation of the segmental gear 95 which is keyed to the shaft 96 actuated by the lever 97 oil will be sucked into the bottom of the pump cylinder through the bores 80, 81, 82, 86, 87, valve chamber 90 and the bore 91. On a downward movement of the pump plunger oil is forced out of the pump cylinder into the bores 91 and the ball valve chamber 90 again but the ball 89 being seated by reason of the pressure of the spring 95 in conjunction with the oil pressure the oil is forced upwardly through the port 96 in the ball valve seat 97 past the ball 98 into the annular chamber 99. From the chamber 99 the oil passes through the longitudinal horizontal bore 100 (Figs. 5 and 11) the forward end of which connects with a vertical bore 101 which in turn connects with a horizontal bore 102 (Fig. 13) leading into the groove 61 and the space between the cylinder head and the interior of the ram. Thus as the oil is forced into the groove the ram is moved downwardly.

In order to connect a pressure gauge into the system to insure proper operation, from adjacent the rear end of the horizontal longitudinal bore 100 a vertical bore 105 passes upwardly (Figs. 5, 11, 12, and 13) connecting with a longitudinal horizontal bore 106 which in turn connects with a vertical bore 107 threaded to receive a pressure gauge 56. Thus the pressure gauge is at all times tied into the oil system on the pressure side of the ram.

Figure 12:
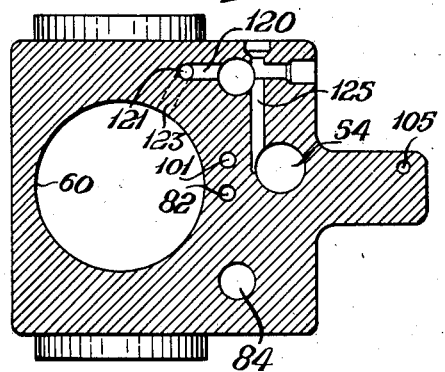
Figure 11:
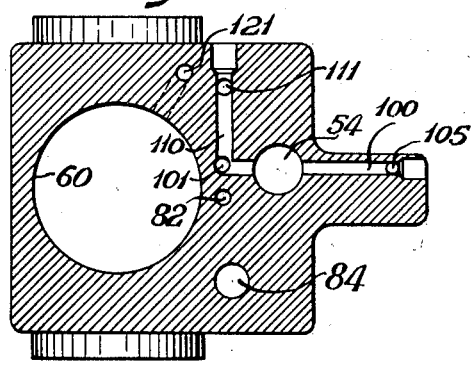
Figure 13:
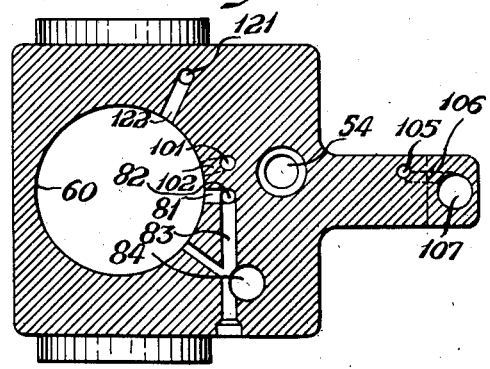

To release pressure on the ram, a transverse horizontal bore 110 connects the longitudinal horizontal bore 100 with a vertical bore 111 carrying the pressure release valve 55 (Figs. 6, 11 and 12). Above and connecting with the bore 111 may be an annular ball valve chamber 112 in which lies a ball 113 which may be pressed on to its seat by the lower end of a shaft 114 in threaded engagement with bore 116 axially aligned with bore 111. The upper end of the shaft 114 may extend above the upper level of the head 20 and may be fitted with a lever 115 to facilitate turning of the shaft. When pressure is released by turning the lever, i. e., permitting pressure to open the ball valve, oil passes through the chamber 112 into a longitudinal horizontal bore 120 connecting with a vertical bore 121 from adjacent the upper end of which a short horizontal bore 122 leads into the upper part of the sump 57. The groove 62 is also connected to the vertical bore 121 by the horizontal bore 123 and through it to the sump. Thus any oil which leaks down between the ram and the cylinder walls is returned to the sump and at no time is there pressure on the packing gasket 63.

The annular pressure chamber 99 which is under pressure when the ram is being lowered is normally cut off from the bore 125 (and hence the sump) by a spring controlled ball valve (Fig. 5) in which the ball 128 is normally kept seated, on the upper end of a vertical passageway 129, connecting the chamber 99 with the bore 125, by a spring actuated plunger 130. As is conventional practice the tension of the spring may be adjusted by a nut 131 threaded into the bore above the spring. The spring preferably may be adjusted to permit the valve to open at the maximum pressure under which it is desired to work the rams, e. g., 3000 kilograms. To provide eliminating any possibility of back pressure on the ball 128, a transverse horizontal bore 125 connects the bore 120 and hence the sump at all times with the pressure relief valve 54 (Figs. 5 and 12).

While it has not been specifically shown it will be obvious to those skilled in the art that the bores must be drilled from the outer surfaces of the block and it is contemplated that all of these bores be suitably threaded and capped or otherwise closed.

From the description above given it will be obvious that a Brinell hardness testing machine has been provided that is complete in itself or from which may be separated a self contained head which is operable wherever a suitable clamp or vise may be found. Further, it will be apparent that the testing machine is operable in any position in which it may be placed and this without any danger of leakage of the hydraulic fluid.

Various modifications may be made in the above described embodiment of the invention without departing from the spirit and scope thereof as set forth in the following claims.

What is claimed is:

1. A portable Brinell testing device comprising a Brinell tester head, a carriage having spaced arms provided with arcuate sockets at their lower portions near one extremity, the arms extending on either side of the head, arcuate bosses on the head engaging in the sockets and means cooperative with the bosses for fastening the head in position between the arms.

2. In a portable Brinell hardness tester, the combination of a base, two screws rigid with said base, a carriage mounted on said screws, movable relative to said base and comprising a pair of gear driven nuts respectively disposed on the screws, gears for driving the nuts and a crank mounted on the carriage for turning the gears, an indentor, a test head supporting and capable of applying a load to said indentor, means including coaxial arcuate bosses on said test head and correspondingly curved recesses in said carriage for mounting said test head in the carriage, and means for releasably locking said test head with respect to said carriage with the bosses in said recesses.

ANDREW KING.
HORACE C. KNERR.